(12) United States Patent
White et al.

(10) Patent No.: US 7,040,710 B2
(45) Date of Patent: May 9, 2006

(54) VENTILATED SEAT

(75) Inventors: Brennon L. White, Commerce, MI (US); Mary J. Lumbard, Dextar, MI (US); Anne P. Liss, Livonia, MI (US); William G. Reed, Walled Lake, MI (US)

(73) Assignee: Johnson Controls Technology Company, Holland, MI (US)

( * ) Notice: Subject to any disclaimer, the term of this patent is extended or adjusted under 35 U.S.C. 154(b) by 262 days.

(21) Appl. No.: 09/755,505

(22) Filed: Jan. 5, 2001

(65) Prior Publication Data

US 2002/0096931 A1 Jul. 25, 2002

(51) Int. Cl.
A47C 7/02 (2006.01)

(52) U.S. Cl. .............................. 297/452.46; 297/452.42; 297/180.1

(58) Field of Classification Search ............ 297/452.42, 297/180.1, 180.11, 180.12, 180.16, 452.46, 297/452.47, 180.14
See application file for complete search history.

(56) References Cited

U.S. PATENT DOCUMENTS

| 374,424 A | 12/1887 | Ober |
| 390,154 A | 9/1888 | Beach |
| 1,370,832 A | 3/1921 | Mollberg |
| 1,439,681 A | 12/1922 | Alkire |
| 1,475,912 A | 11/1923 | Williams |
| 1,514,329 A | 11/1924 | Metcalf |
| 1,537,460 A | 5/1925 | Campbell |
| 1,593,066 A | 7/1926 | Gaston |
| 1,664,636 A | 4/1928 | Mayer |
| 1,837,515 A | 12/1931 | Bachrach |
| 1,936,960 A | 11/1933 | Bowman |
| 2,022,959 A | 12/1935 | Gordon |
| 2,103,553 A | 12/1937 | Reynolds |
| 2,158,801 A | 5/1939 | Petterson |
| 2,336,089 A | 12/1943 | Gould |
| 2,493,303 A | 1/1950 | McCullough |
| 2,544,506 A | 3/1951 | Kronhaus |
| 2,703,134 A | * 3/1955 | Mossor .................. 297/180.14 |
| 2,749,906 A | 6/1956 | O'Connor |
| 2,758,532 A | 8/1956 | Awe |

(Continued)

FOREIGN PATENT DOCUMENTS

| DE | 3705756 | 10/1988 |
| DE | 19736951 | 3/1999 |
| DE | 19954978 | 1/2001 |
| EP | 0936105 | 8/1999 |
| FR | 1266925 | 7/1961 |
| FR | 2630056 | 10/1989 |
| WO | WO 02/06914 | 1/2002 |

Primary Examiner—Peter M. Cuomo
Assistant Examiner—Stephanie Harris
(74) Attorney, Agent, or Firm—Foley & Lardner LLP

(57) ABSTRACT

A ventilated vehicle seat includes a bag formed from impermeable materials enclosing a spacer material. The latter preferably includes upper and lower netting sheets and fibers extending between the netting sheets, the fibers being sufficiently resilient to prevent total collapse of the spacer material when the seat is occupied. An air mover forces air into or draws air from the bag is coupled to the air space between the air impermeable layers. Holes are provided in the top of the bag, and the sizes are preferably selected to equalize air flow over the seating surface, rather than having all the air flow through the openings nearest the fan. An optional, porous heating layer may be located above the bag. The ventilation and trim components are preferably sewn into the seat in a single operation.

25 Claims, 3 Drawing Sheets

U.S. PATENT DOCUMENTS

| | | | |
|---|---|---|---|
| 2,782,834 A | 2/1957 | Vigo | |
| 2,791,956 A | 5/1957 | Guest | |
| 2,826,135 A | 3/1958 | Benzick | |
| 2,931,286 A | 4/1960 | Fry, Sr. | |
| 2,976,700 A | 3/1961 | Jackson | |
| 2,978,972 A | 4/1961 | Hake | |
| 2,992,604 A | 7/1961 | Trotman | |
| 2,992,605 A | 7/1961 | Trotman | |
| 3,030,145 A | 4/1962 | Kottemann | |
| 3,101,037 A | 8/1963 | Taylor | |
| 3,101,660 A | 8/1963 | Taylor | |
| 3,131,967 A | 5/1964 | Spaulding | |
| 3,136,577 A | 6/1964 | Richard | |
| 3,137,523 A | 6/1964 | Karner | |
| 3,486,177 A | 12/1969 | Marshack | |
| 3,529,310 A | 9/1970 | Olmo | |
| 3,628,829 A | 12/1971 | Heilig | |
| 3,681,797 A | 8/1972 | Messner | |
| 3,732,944 A | 5/1973 | Kendall | |
| 3,736,022 A | 5/1973 | Radke | |
| 3,757,366 A | 9/1973 | Sacher | |
| 3,778,851 A | 12/1973 | Howorth | |
| 3,948,246 A | 4/1976 | Jenkins | |
| 4,002,108 A | 1/1977 | Drori | |
| 4,043,544 A * | 8/1977 | Ismer | 267/83 |
| 4,060,276 A | 11/1977 | Lindsay | |
| 4,072,344 A | 2/1978 | Li | |
| 4,141,585 A | 2/1979 | Blackman | |
| 4,175,297 A | 11/1979 | Robbins | |
| 4,391,009 A | 7/1983 | Schild | |
| 4,413,857 A * | 11/1983 | Hayashi | 297/180 |
| 4,509,792 A | 4/1985 | Wang | |
| 4,589,656 A | 5/1986 | Baldwin | |
| 4,685,727 A | 8/1987 | Cremer | |
| 4,712,832 A | 12/1987 | Antolini | |
| 4,729,598 A | 3/1988 | Hess | |
| 4,847,933 A | 7/1989 | Bedford | |
| 4,853,992 A | 8/1989 | Yu | |
| 4,866,800 A | 9/1989 | Bedford | |
| 4,923,248 A | 5/1990 | Feher | |
| 4,946,220 A * | 8/1990 | Wyon et al. | 297/180 |
| 4,981,324 A * | 1/1991 | Law | 297/180 |
| 4,997,230 A | 3/1991 | Spitalnick | |
| 5,002,336 A * | 3/1991 | Feher | 297/180 |
| 5,004,294 A | 4/1991 | Lin | |
| 5,016,302 A | 5/1991 | Yu | |
| 5,102,189 A | 4/1992 | Saito | |
| 5,106,161 A | 4/1992 | Meiller | |
| 5,160,517 A | 11/1992 | Hicks | |
| 5,211,697 A | 5/1993 | Kienlein | |
| 5,226,188 A | 7/1993 | Liou | |
| 5,292,577 A | 3/1994 | Van Kerrebrouck | |
| 5,335,381 A | 8/1994 | Chang | |
| 5,354,117 A | 10/1994 | Danielson | |
| 5,356,205 A | 10/1994 | Calvert | |
| 5,370,439 A * | 12/1994 | Lowe et al. | 297/180.11 |
| 5,372,402 A | 12/1994 | Kuo | |
| 5,382,075 A | 1/1995 | Shih | |
| 5,385,382 A | 1/1995 | Single, II | |
| 5,403,065 A | 4/1995 | Callerio | |
| 5,408,711 A | 4/1995 | McClelland | |
| 5,411,318 A | 5/1995 | Law | |
| 5,416,935 A | 5/1995 | Nieh | |
| 5,561,875 A | 10/1996 | Graebe | |
| 5,590,428 A | 1/1997 | Roter | |
| 5,597,200 A | 1/1997 | Gregory | |
| 5,613,729 A | 3/1997 | Summer, Jr. | |
| 5,613,730 A | 3/1997 | Buie | |
| 5,626,386 A | 5/1997 | Lush | |
| 5,626,387 A | 5/1997 | Yeh | |
| 5,645,314 A | 7/1997 | Liou | |
| 5,692,952 A | 12/1997 | Chih-Hung | |
| 5,715,695 A | 2/1998 | Lord | |
| 5,787,534 A | 8/1998 | Hargest | |
| 5,833,309 A | 11/1998 | Schmitz | |
| 5,833,321 A | 11/1998 | Kim | |
| 5,902,014 A * | 5/1999 | Dinkel et al. | 297/452.43 |
| 5,918,930 A | 7/1999 | Kawai | |
| 5,921,314 A | 7/1999 | Schuller | |
| 5,921,858 A | 7/1999 | Kawai | |
| 5,924,766 A | 7/1999 | Esaki | |
| 5,924,767 A | 7/1999 | Pietryga | |
| 5,927,817 A | 7/1999 | Ekman | |
| 5,934,748 A | 8/1999 | Faust | |
| 6,003,950 A | 12/1999 | Larsson | |
| 6,019,420 A | 2/2000 | Faust | |
| 6,059,018 A | 5/2000 | Yoshinori et al. | |
| 2001/0035669 A1 | 11/2001 | Andersson et al. | |

* cited by examiner

VENTILATED SEAT

CROSS-REFERENCE TO RELATED APPLICATIONS, IF ANY

None.

BACKGROUND OF THE INVENTION

1. Field of the Invention

The present invention relates generally to the art of vehicle seating and more particularly to ventilated seating wherein air may be forced upwardly from the seating surface or draw downwardly therethrough to enhance occupant comfort. More specifically, the present invention relates to a ventilated seating system which is easy to install into a seat in a single operation and which is easy to adapt to a wide variety of seating designs.

2. Description of the Prior Art

Many different types of ventilated seats are known to the art. They typically are designed to enhance occupant comfort by passing air through the covering of the seat or horizontal through the seat itself. In warm weather the air flow moves in the vicinity of the seat contacted by the occupant's body and assists in cooling and reducing sweating. In cold weather, ventilated seats can help warm the occupant if heated air is forced through the seat or the seat covering. It is known therefore, that air flow in ventilated seats can be in either direction.

It is also known that the air used in ventilated seats can be ambient air (i.e., air of the same temperature as the vehicle interior) or cooled or heated air. For example, a ventilated seat can be coupled to a vehicle's air conditioning system. In addition, known ventilated seating can include flow control to increase or decrease total air flow, as well as direction, such as by having low, medium and high flow settings.

Ventilated vehicle seating, while being known for some time, is not widely used in the industry and is usually an expensive option or standard equipment in luxury priced vehicles. One reason is cost of manufacture, and as noted in many of the patents provided with this application, ventilated seating systems can be complex in design and difficult to install. In many cases providing a ventilation feature becomes a dominant consideration in overall seat design and may force the seat manufacturer to compromise comfort or styling details. In most cases the ventilation components must be carefully located within the seat, and the duct work and air moving apparatus must be accounted for before the final layer of seat cushioning and trim is sewn to the other components. Increased time in assembly equates to increased cost for the manufacturer, the OEM and the ultimate customer. A ventilated seating system which works effectively and provides even air flow at the portions of the seat to be ventilated, and which is less costly to manufacture than prior art ventilated seats, would represent a substantial advance in this art.

FEATURES AND SUMMARY OF THE INVENTION

A primary feature of the present invention is to provide a ventilated seating system which overcomes the above-noted disadvantages of prior art ventilated seats.

Another feature of the present invention is to provide a ventilated seating system which is relatively inexpensive and which can be easily adapted to a variety of seat designs.

A different feature of the present invention is to provide a ventilated seating system which produces a substantially uniform air flow in all of the areas of the seat where ventilation is desired.

Yet another feature of the present invention is to provide a ventilated seating system which may include a heating layer to enhance occupant comfort during cold weather.

Another feature of the present invention is to provide a ventilated seating system, the performance of which is not impaired by heavy occupants.

How these and other features of the invention are accomplished, individually or in various combinations, will be described in the following detailed description of the preferred embodiment, taken in conjunction with the drawings. Generally, however, the features are provided in a ventilated seating system which is located beneath the trim (for example, perforated leather, cloth, etc.) and is installed at the plant of the seat manufacturer. The ventilated seating system includes a bag having upper and lower sheets of non-permeable material which prevent the passage of air except at locations determined by the manufacturer. Within the bag is a three dimensional, expanded spacer material, preferably one which includes upper and lower layers of netting and fibers located therebetween which are stiff and which extend between the upper and lower netting layers. Expanded plastics can also be used. The spacer material is sufficiently stiff to avoid blockage of air flow when the seat is occupied, even by heavy occupants. Holes are provided in the upper surface of the bag, and preferably the holes are provided in a pattern matching the contact area of the occupant. For example, the bag for a seat cushion may include holes arranged in a U-shape, while a seat back might include a linear array of holes extending from the lower part of the seat to the upper part. An air movement system (e.g., a fan or a duct coupled to the vehicle's air conditioning system) is coupled to the bag and hence to the air space created by the spacer material to cause air movement laterally, longitudinally and vertically through the spacer material. If the air movement system is in a suction mode, air is drawn through the holes, into the spacer material and out of the bag. In a pressurization-mode, air is forced into the bag and outwardly through the holes. The features of the present invention are also accomplished by altering the hole sizes so that holes nearer the air flow entrance or exit are smaller, thereby equalizing the amount of air which passes through the holes. An optional heater pad may be employed as a layer between the seat trim layer and the upper layer of the bag, or heating may be accomplished by coupling the air mover to the vehicle forced air heating system. For cooling, ambient air may be used, or the fan may be coupled to the vehicle's air conditioning system. Other ways in which the features of the present invention are accomplished will become apparent to those skilled in the art after they have read the following detailed description of the preferred and alternate embodiments, such other ways also being deemed by the present inventors to be within the scope of the present invention if they fall within the scope of the claims which follow.

BRIEF DESCRIPTION OF THE DRAWINGS

In the following drawings like reference numerals are used to indicate like components.

FIG. 4 is a partial cross sectional view of the cover taken generally along lines 4–4 of FIG. 1.

DETAILED DESCRIPTION OF THE PREFERRED AND ALTERNATE EMBODIMENTS

Before beginning the detailed description of the preferred and alternate embodiments, several general comments can be made about the applicability and the scope of the present invention.

Figure 2:
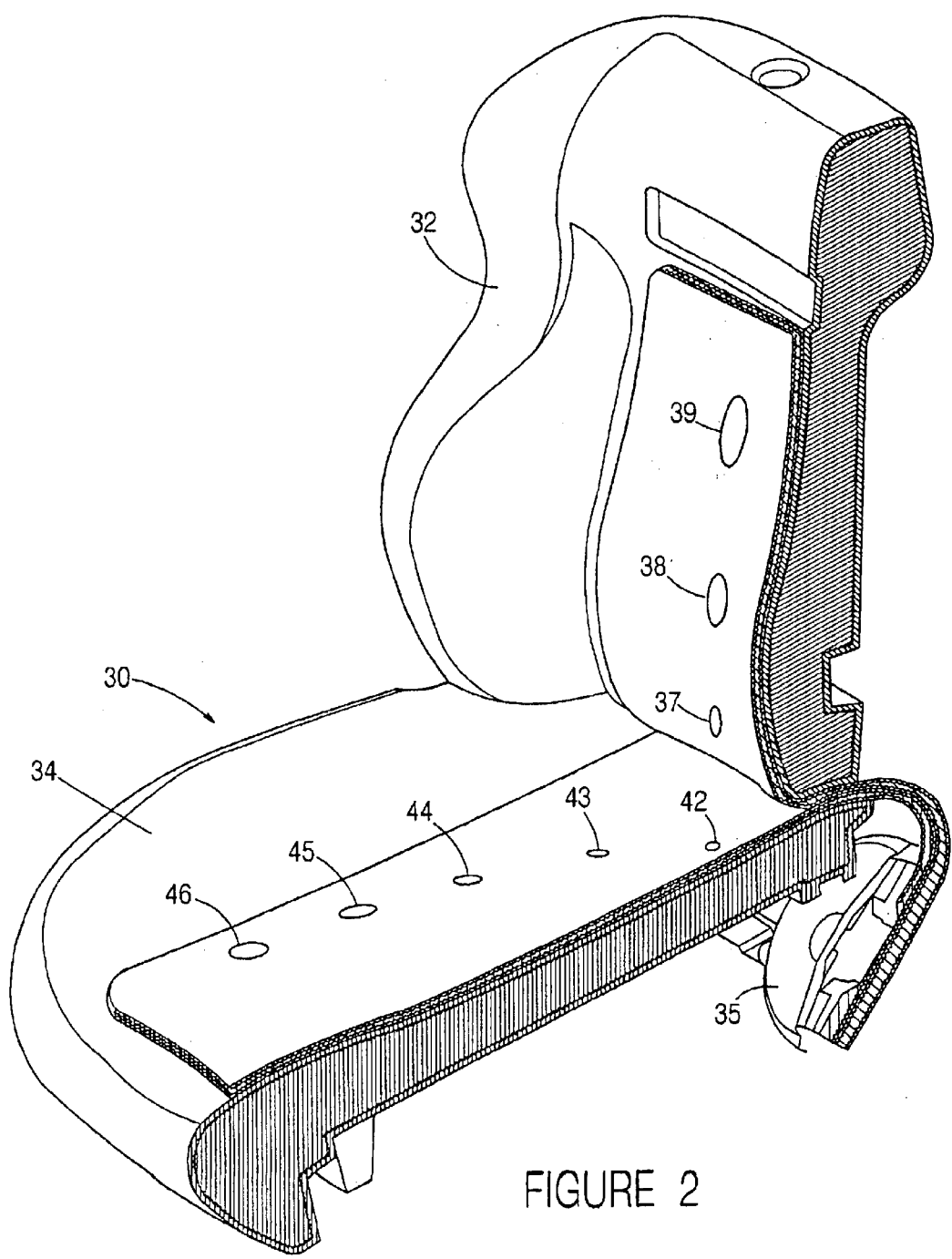
FIG. 2 is a perspective, schematic view of the ventilated seating system of the present invention (with the upper trim and the optional heating layer removed) showing the placement of two ventilated seating bags on the cushion and seatback and illustrating the coupling thereof to a single fan.

First, the ventilated heating system of this invention can be used with a wide variety of seats, including the sport or bucket type seat illustrated in FIG. 2 or in bench seating. For the latter, the ventilation system may be occupant selective, i.e., may have separate controls for different portions of the same seat, or may have a single bag system with one control.

Second, the ventilated heating system of this invention is shown with an air-permeable optional heating pad over the upper layer of the bag and beneath the trim of the seat. Other ways of seat heating may be employed, such as coupling the air space within the bag to the vehicle's air heating system.

Third, it is preferable that the ventilated seating system of the present invention be sewn along with seat trim and cushioning components to enhance manufacturing efficiency. However, the bag may be assembled as a separate component and then placed in the seat and coupled to the fan as a separate unit. In this regard, it should be noted that cushioning and other comfort layers which are not illustrated or described in detail in the specification may be used. If cushion layers are placed over the top of the bag, they should be open pore to permit air to readily pass through them.

Fourth, the way in which the fan illustrated in the drawings is coupled to sources of cooled, heated or ambient air is not shown in detail, but if it is desired to couple the fan to either the air cooling system of the vehicle or to the vehicles air heating system, conventional duct work used in the vehicle manufacturing field may be employed to convey temperature modified air from the source to the fan.

Fifth, with the exception of the spacer material, which is located within the air-impermeable bag, the materials used for constructing the trim, heater pad and the bag itself may be selected from a wide range of materials. For the trim, air-permeable materials should be selected, such as cloth or perforated leather, but the thickness, color, etc., may be widely varied. Other spacer materials, such as expanded plastics, can be employed within the air-impermeable bag, so long as air flow is permitted to occur in any direction, i.e., longitudinally, laterally, or vertically within the spacer material itself. The preferred spacer material to be used herein is a series 5900 spacer material manufactured by Mueller Textile of Wiehl, Germany. This material, in addition to providing air distribution benefits, also provides comfort benefits and includes an upper netting layer, a lower netting layer and a plurality of stiffened resin fibers extending between the netting layers. It may deform slightly when an occupant sits on the seat, but the material is sufficiently resilient that it will not be crushed to the point the air flow is blocked, thereby impairing the effectiveness of the seat ventilation. In the preferred embodiment, the upper layer of the bag is made of a dual layer material having a first lower layer consisting of an air-impermeable resin film, over which is placed a thin foam layer. A suitable material is Pladilon™ material, manufactured by Foamex International, Inc., of Southfield, Mich., U.S.A.

Figure 1:
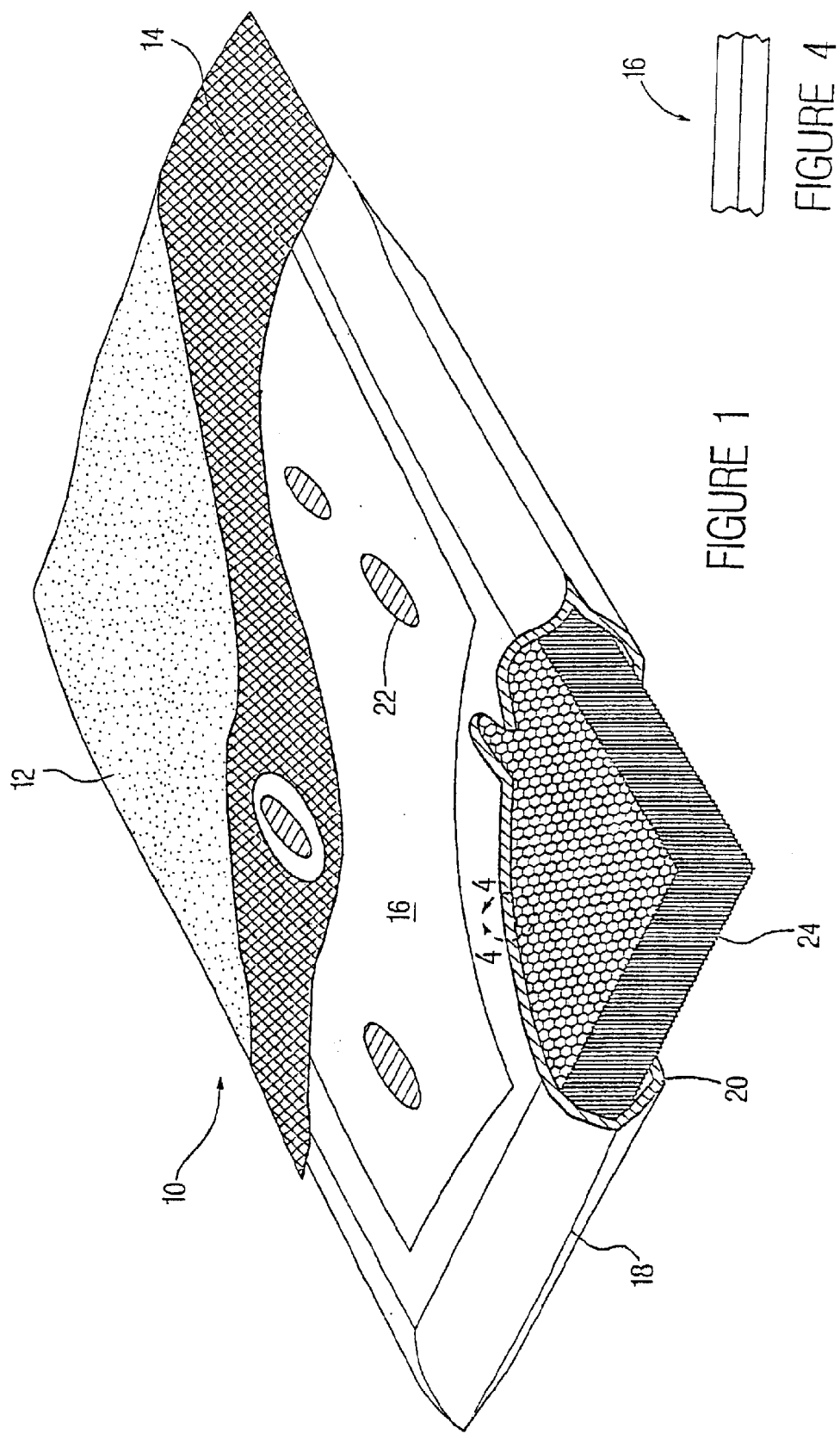
FIG. 1 is a perspective, schematic view, with portions broken away, showing the main components of the ventilated seating system according to the preferred embodiment of the present invention.

Proceeding now to a description of the preferred embodiment, FIG. 1 shows in schematic form with portions cut away, a ventilated seat assembly 10 according to the preferred embodiment of the present invention. Assembly 10 includes a number of different layers which, in various aspects of the invention can be varied and/or eliminated as mentioned above. The upper layer of seat assembly 10 is the perforated trim which preferably is cloth or perforated leather. Located beneath the trim 12 is an air-permeable heater layer 14. Located beneath heater layer 14 is the top layer 16 of a bag 18. The bottom 20 of bag 18 is also shown in this Figure, as is the joining of the top 16 and bottom 20 to form an air-impermeable bag, except for a plurality of holes 22 formed in the bag top 16. It can be noted in FIG. 1 that a hole can be formed in the heater pad 14, but if the heater pad material is air permeable, it is not necessary to do so. It will also be noted in FIG. 1 that the size of the holes 22 located near the lower portion of the FIGURE are larger than holes nearer the heater pad 14. More will be said in this regard later.

The final component of assembly 10, as shown in FIG. 1, is a spacer material 24. As indicated earlier, the preferred spacer material is the Mueller Textile material which includes an upper netting layer, a lower netting layer and a plurality of fibers extending between them. This material has sufficient resiliency to prevent crushing of spacer layer 24 when an occupant sits on or leans back against a ventilated seat assembly 10.

FIG. 2 illustrates the use of two bags attached to a seat 30 comprised of a seatback 32 and a seat cushion 34. One bag 10 resides along the center area of the seatback 32, while another bag is located at the center portion of the cushion 34. The bags each extend through the bite line of the seat and the bag impermeable layers are suitably coupled to a fan 35 located below the bite line.

FIG. 2 also illustrates in greater detail the aspect of the preferred embodiment of the present invention which varies the size of the holes 22 as the distance from the air mover increases. In this Figure, three openings are provided in the bag extending up the backrest 32 with holes 37, 38 and 39 becoming gradually larger as the distance from fan 35 increases. A linear pattern is provided for these holes, as that pattern has been found to be acceptable for the heating or cooling of an occupant. The bag located on the cushion 34 also includes a pattern of openings 22, this time the openings being provided in a U-shape to rest under the legs and seat of the occupant. The opening 42 at the bottom of the "U" is the smallest and sets of openings 43, 44, 45, and 46 extend in a spaced relationship toward the front of the bag and grow gradually larger. This size and arrangement of the air holes, with the smaller holes being near the air mover, contributes to a more uniform flow of air from the air mover, in this case fan 35. It should be understood however, that the hole sizes may be the same without departure from the scope of this invention.

Figure 3:
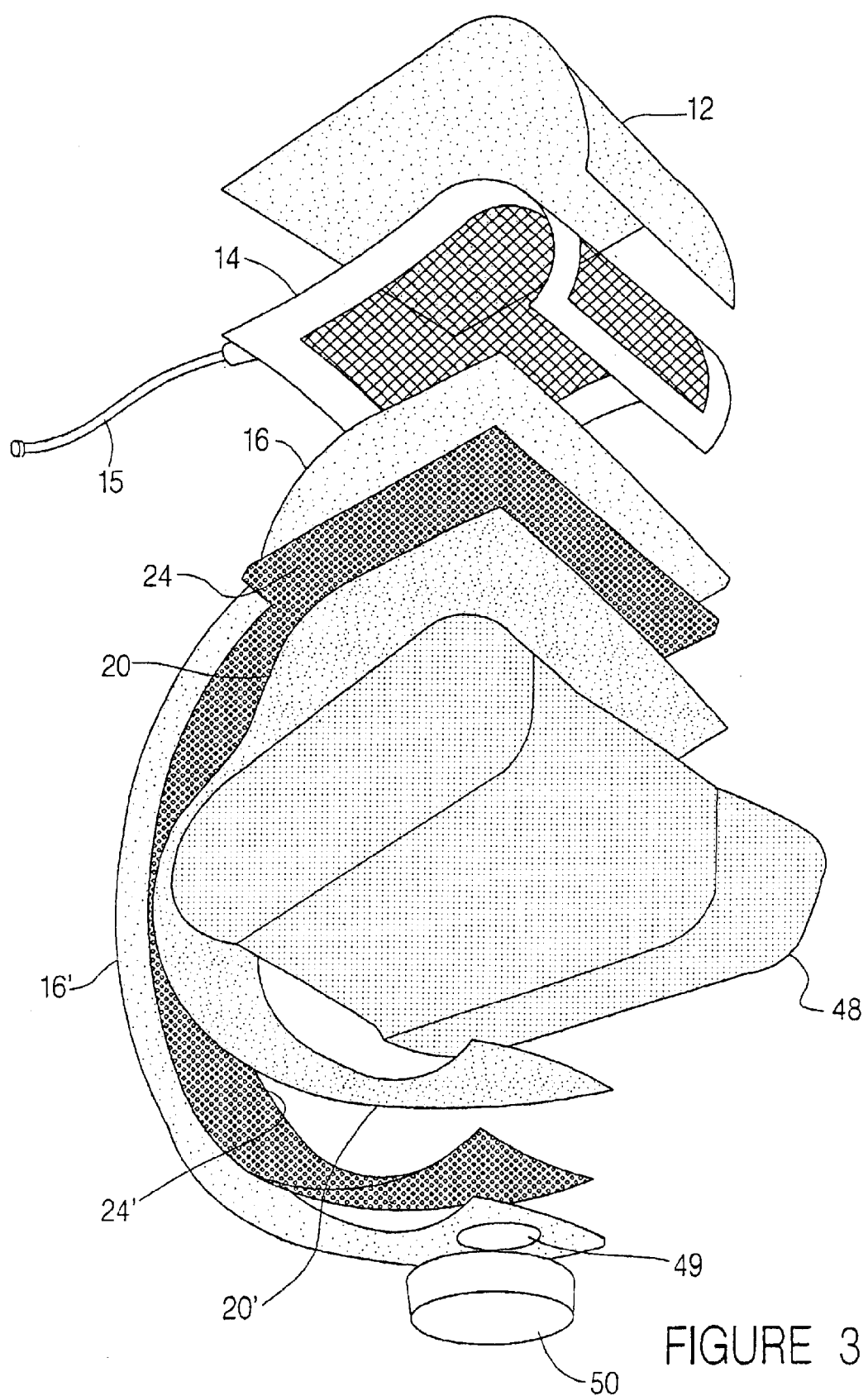
FIG. 3 is an exploded view of the major components of the present invention.

Proceeding next to FIG. 3, a more detailed, exploded view of a single bag is shown. The same reference numerals will be used as were used in connection with FIG. 1 for the various layers. Proceeding from the top, the perforated trim layer 12 is shown above the heater layer 14 (and in this case, the electrical coupling through wires 15 is shown). The bag top 16 is located beneath the heater and the spacer material 24 is then provided. Bottom 20 of the bag completes the assembly on a seat cushion 48.

In FIG. 3, each of the bag top 16, spacer 24 and bag bottom 20 include elongate tails marked with the same reference number with a prime sign (e.g. 16'). In the illustrated embodiment, these extend through the seat bite line and an opening 49 is provided in the material forming the bag top 16. In this Figure, a fan 50 acts as the air mover and is coupled to opening 49. Depending on the seat style and location, the tail may extend forwardly or to the side.

In use, the system illustrated in FIG. 3 is preferably sewn to the seat at the same time trim 12 is attached. Components 12, 14, 16 and 20 can be sewn together, the sewing of the latter two forming a portion of the seal extending about bag 18. Components 16' and 20' would be sewn along their edges to maintain the air-impermeability in that area. The attachment of the fan itself could be made in any suitable manner, such as by using an adhesive or the like. It is also easy to understand by reference to FIG. 3 how other air moving systems could be employed for the ventilated seat of the present invention. For example, a duct extending from the vehicle's air conditioning system could have its end coupled in a sealed relationship to opening 49 to allow heated or cooled air to pass along the spacer to the holes (not shown in this Figure) and the bag top 16. It can also be mentioned again here that the speed and direction of air movement can be controlled by a separate controller coupled to the air mover 50 or by using the fan speed and temperature controls of the vehicle. If a fan 50 is used which is not directly coupled to the vehicle's air conditioning system, it is preferred that the fan be reversible to operate in a pressurizing or suction mode and that the fan be multi-speed, i.e., having at least low, medium and high settings.

While the present invention has been described in connection with single preferred and then the alternate embodiment, the present invention is not to be limited thereby but is to be limited solely by the scope of the claims which follow.

What is claimed is:

1. A ventilated seat for a vehicle comprising:
   a vehicle seat having a seat cushion component and a seat backrest component, at least one of which is ventialted, each ventilated component having an air-permeable trim surface at the occupant contact areas of the seat;
   a bag formed of air-impermeable material located beneath the trim surface of each ventilated component, the bag including a top and a bottom, the top being nearer the trim surface, holes formed in the bag top to permit air flow therethrough;
   a spacer located within the bag permitting air to flow in any direction through the spacer, the spacer being sufficiently resilient to prevent blockage of air flow when it is compressed by an occupant sitting in the seat;
   a bag opening; and
   an air mover coupled to the bag opening;
   wherein some bag holes are located nearer the bag opening than other holes and the size of the holes increases as the distance from the bag opening increases.

2. The ventilated seat of claim 1, wherein the spacer comprises an upper netting layer adjacent the bag top, a lower netting layer adjacent the bag bottom and a plurality of plastic fibers extending between the upper netting layer and the lower netting layer.

3. The ventilated seat of claim 1, wherein the bag top includes an inner resin air-impermeable film layer and an outer covering of foam.

4. The ventilated seat of claim 1, wherein the air mover is a fan coupled to a bag opening.

5. The ventilated seat of claim 1, wherein the air mover is the vehicle's air conditioning system.

6. The ventilated seat of claim 1 comprising an electrically powered heater layer between the bag top and the trim surface.

7. The ventilated seat of claim 1, wherein the bag holes are arranged in a pattern generally corresponding to the contact area an occupant would have with the seat.

8. The ventilated seat of claim 1, wherein both the seat cushion component and the seat backrest component are ventilated.

9. The ventilated seat of claim 8, wherein a single air mover is coupled to the two bags, the air mover being coupled to an extension of each bag.

10. The ventilated seat of claim 8, wherein both bag tops are made from an inner film resin layer and an outer covering of foam.

11. The ventilated seat of claim 1, wherein the air mover is adapted to force air into the bag and outwardly through the holes and is a variable speed air mover.

12. The ventilated seat of claim 1, wherein the air mover is adapted to suction air from the bag and inwardly through the holes and is a variable speed air mover.

13. The ventilated seat of claim 1, wherein the air mover is reversible and adapted to selectively draw air from or force air into the bag.

14. A ventilated seat assembly comprising:
   a seat having a generally horizontal cushion and a backrest, the seat also having an air-permeable decorative exterior trim cover, a bag including an air-impermeable top, an air-impermeable bottom and an opening coupled to an air mover, wherein a pattern of holes is provided in the bag top, and a spacer is located within the bag, the holes being arranged and sized to provide a generally uniform air movement through the holes, wherein some holes are located nearer the bag opening than other holes and the size of the holes increases as the distance from the bag opening increases.

15. The seat assembly of claim 14, wherein the spacer is adapted to maintain airflow throughout the bag when an occupant sits on the seat.

16. The seat assembly of claim 15, wherein the spacer comprises an upper netting layer adjacent the bag top, a lower netting layer adjacent the bag bottom and a plurality of plastic fibers extending between the upper netting layer and the lower netting layer.

17. The seat assembly of claim 15, wherein the bag top includes an inner resin air-impermeable film layer and an outer covering of foam.

18. The seat assembly of claim 16, wherein the air mover is a fan.

19. The seat assembly of claim 16, wherein the bag holes are arranged in a pattern generally corresponding to the contact area an occupant would have with the seat.

20. A ventilated seat for a vehicle comprising:
   a vehicle seat having a seat cushion component and a seat back rest component forming a bite line therebetween, each of which is ventilated, each ventilated component having an air-permeable trim surface at the occupant contact areas of the seat;
   a bag formed of air-impermeable material located beneath the trim surface of each ventilated component, the bag including a top and a bottom, the top being nearer the trim surface, holes formed in the bag top to permit air flow therethrough;

a spacer located within the bag permitting air flow in any direction through the spacer, the spacer being sufficiently resilient to prevent blockage of air flow when it is compressed by an occupant sitting in the seat;

a portion of each bag and spacer extending through the bite line between the seat cushion component and the seat backrest component;

a bag opening located in the portion of the bag extending through the bite line; and an air mover coupled to the bag opening;

wherein some holes are located nearer the bag opening than other holes and the size of the holes increases as the distance from the bag opening increases.

21. A ventilated seat assembly comprising:

a seat having a generally horizontal cushion and a backrest, the seat also having an air-permeable decorative exterior trim cover, a bag including an air-impermeable top, an air-impermeable bottom and an opening coupled to an air mover, wherein a plurality of holes are provided in the bag top, and a spacer is located within the bag, the holes being arranged and sized to provide a generally uniform air movement through the bag, some of the holes being located nearer the bag opening than other holes and each hole having a cross-sectional area, wherein the holes located substantially the same distance from the bag opening comprise a group having a total cross-sectional area of each group of holes increases as the distance of the group of holes from the bag opening increases.

22. The seat assembly of claim 21, wherein the bag holes are arranged in a pattern generally corresponding to the contact area an occupant would have with the seat.

23. The seat assembly of claim 21, wherein the air mover is a fan.

24. The seat assembly of claim 21, wherein the spacer comprises an upper netting layer adjacent the bag top, a lower netting layer adjacent the bag bottom and a plurality of plastic fibers extending between the upper netting layer and the lower netting layer.

25. The seat assembly of claim 21 wherein at least one of the groups of holes includes more than one hole.

* * * * *

UNITED STATES PATENT AND TRADEMARK OFFICE
CERTIFICATE OF CORRECTION

PATENT NO.         : 7,040,710 B2
APPLICATION NO.    : 09/755505
DATED              : May 9, 2006
INVENTOR(S)        : Brennon L. White et al.

It is certified that error appears in the above-identified patent and that said Letters Patent is hereby corrected as shown below:

Column 5, line 42, replace "ventialted" with --ventilated--.

Column 6, line 59, replace "back rest" with --backrest--.

Column 7, line 1, insert --to-- between "air" and "flow".

Column 8, line 6, insert --, the bag including more than one group of holes, and wherein the total cross-sectional area-- between "area" and "of".

Signed and Sealed this

Twenty-first Day of November, 2006

JON W. DUDAS
*Director of the United States Patent and Trademark Office*